United States Patent
Aubert

(10) Patent No.: US 8,861,651 B2
(45) Date of Patent: Oct. 14, 2014

(54) PROCESS FOR PERFORMING A QR DECOMPOSITION OF A CHANNEL MATRIX IN A MIMO WIRELESS COMMUNICATION SYSTEM, AND RECEIVER FOR DOING THE SAME

(75) Inventor: Sébastien Aubert, Nice (FR)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/880,111

(22) PCT Filed: Oct. 18, 2011

(86) PCT No.: PCT/EP2011/005225
§ 371 (c)(1),
(2), (4) Date: May 20, 2013

(87) PCT Pub. No.: WO2012/052154
PCT Pub. Date: Apr. 26, 2012

(65) Prior Publication Data
US 2014/0146862 A1 May 29, 2014

Related U.S. Application Data

(60) Provisional application No. 61/421,384, filed on Dec. 9, 2010.

(30) Foreign Application Priority Data

Oct. 19, 2010 (EP) .................................... 10368041

(51) Int. Cl.
*H04L 27/06* (2006.01)
*H04B 7/04* (2006.01)
*H04L 25/02* (2006.01)

(52) U.S. Cl.
CPC .......... *H04B 7/0456* (2013.01); *H04L 25/0242* (2013.01); *H04L 25/0246* (2013.01)
USPC ....................................... 375/340

(58) Field of Classification Search
USPC ......... 375/260, 262, 267, 316, 340, 346, 349, 375/350
See application file for complete search history.

(56) References Cited

U.S. PATENT DOCUMENTS

| | | | |
|---|---|---|---|
| 8,199,841 B1 * | 6/2012 | Sarrigeorgidis et al. ...... | 375/267 |
| 8,223,872 B1 * | 7/2012 | Zhang et al. .................. | 375/267 |
| 2011/0007851 A1 * | 1/2011 | Li ................................. | 375/340 |

FOREIGN PATENT DOCUMENTS

| | | |
|---|---|---|
| EP | 1863243 A1 | 12/2007 |
| EP | 1922815 A1 | 5/2008 |

(Continued)

OTHER PUBLICATIONS

Wang, X. et al. "OFDM Channel Estimation Based on Time-Frequency Polynomial Model of Fading Multipath Channel." IEEE VTS 54th Vehicular Technology Conference, Oct. 7, 2001, pp. 460-464, vol. 1.

(Continued)

*Primary Examiner* — Khanh C Tran
(74) *Attorney, Agent, or Firm* — Coats and Bennett, PLLC

(57) ABSTRACT

A process for performing a QR Decomposition of a channel matrix of a wireless communication channel system, said process involving the steps of: performing a full QR Decomposition of one channel matrix for the purpose of deriving a first QR representation of the channel; performing a second iterative QR Decomposition of an adjacent channel matrix, said second iterative QR Decomposition using the results of said first QR representation as well as the difference of the two adjacent channel matrices ΔH. More particularly, the process is characterized in that the iterative QR Decomposition is performed in response to the detection of a high level of workload of the processor.

10 Claims, 6 Drawing Sheets

(56) References Cited

FOREIGN PATENT DOCUMENTS

| EP | 1922816 | A2 | 5/2008 |
|---|---|---|---|
| WO | 2007015804 | A2 | 2/2007 |
| WO | 2007019679 | A2 | 2/2007 |
| WO | 2007019683 | A1 | 2/2007 |
| WO | 2008021535 | A2 | 2/2008 |

OTHER PUBLICATIONS

Dopico, F. et al. "Perturbation Theory for Factorizations of LU Type Through Series Expansions." 2005 Society for Industrial and Applied Mathematics, Siam J. Matrix Anal. Appl., vol. 27, No. 2, Nov. 22, 2005, pp. 561-581.

Stewart, G.W. "On the Pertubation of LU, Cholesky and QR Factorizations." IMA Preprint Series #949, Apr. 1992, pp. 491-505.

3rd Generation Partnership Project. "3rd Generation Partnership Project; Technical Specification Group Radio Access Network; Evolved Universal Terrestrial Radio Access (E-UTRA); User Equipment (UE) radio transmission and receipt (Release 8)." 3GPP TS 36.101, V8.8.0, Dec. 2009, Sophia Antipolis Valbonne, France.

* cited by examiner

Mean $\|\cdot\|_F$ as a function of $n$, 4x4 complex matrices, 1000 simulations.

PROCESS FOR PERFORMING A QR DECOMPOSITION OF A CHANNEL MATRIX IN A MIMO WIRELESS COMMUNICATION SYSTEM, AND RECEIVER FOR DOING THE SAME

TECHNICAL FIELD

The present invention relates to the field of wireless communications and more to particularly to a process for performing a QR Decomposition (QRD) of a channel matrix in a Multiple-Input Multiple-Output (MIMO) wireless communication system.

BACKGROUND ART

Nowadays, the MIMO technique is widely known in the art of wireless communication, and is based on the use of multiple antennas at both the transmitter and receiver of a telecommunication system in order to improve communication capacity or/and performance.

One well known transmission technique used in MIMO systems is the so-called spatial multiplexing and is based on the transmission of independent and separately encoded data signals from each of the multiple transmit antennas of a wireless communication system. In that way, the space dimension is reused (multiplexed) more than one time, leading to a data flow increase. Spatial multiplexing is a very efficient technique for increasing channel capacity at higher signal-to-noise ratios (SNR).

However, a main spatial multiplexing MIMO problematic lies on the signal detection process. In particular, the processing resources used in detectors of spatial multiplexing MIMO systems, are not always adequate for detecting the signal received by the receiver of such systems. One well known detector considered for signal detection in spatial multiplexing MIMO communication systems is the optimal but infeasible Maximum Likelihood (ML) detector.

FIG. 1 illustrates a MIMO system which comprises a transmitter Tx including multiple transmit antennas and a receiver Rx including multiple receive antennas. The multiple antennas of the transmitter Tx send multiple data signals (streams) through a channel represented by a complex matrix H taking account of all the paths between the transmit antennas and the receive antennas. Afterwards, the receiver Rx receives the data signals by the multiple antennas and decodes those vectors, thus providing the transmit vector estimate belonging to the original information. In particular, a MIMO system can be modeled as follows:

$$r = Hs + n \quad (1)$$

where r and s represent a receive and a transmit signal vector respectively, while H and n represent the channel matrix and a noise vector respectively.

It can be seen on the equation above, that the detection of the transmitted signal s with the classical linear detectors would require the (pseudo-)inversion of matrix H which, even in the case of OFDM, would be full rank because of the MIMO architecture.

Generally speaking, in the more recent receivers, this computation of the transmitted signal is solved by means of a so-called QR Decomposition (QRD) which accuracy is critical so as to ensure good detection performance of the receiver.

As known by the skilled man, a QRD (also called a QR factorization) is based on a decomposition of channel matrix H in two distinctive matrices, i.e. a first unitary matrix Q and a second—upper triangular—matrix R as illustrated in FIG. 2. The significant advantage of QRD is that it provides a way of making the receive vector entries iteratively independent, thus reducing the complexity of the QRD-based detector compared to the ML joint detector. Specifically, because of the unitary nature of matrix Q (which means that $Q^H Q = I$), the Hs term in equation (1) is multiplied by $Q^H$ and thus simultaneously reads Rs and $Q^H y$ which is possibly solved in a system resolving-like way, since R is triangular. Thus, the ML equation from (1) can be re-arranged and thus can be iteratively solved. The transmit signals of the MIMO system can then be detected from the received signal by the receiver and decoded by any known technique so as to regenerate the original symbols s.

There are several methods for computing the QRD, such as the Gram-Schmidt process, the Householder transformations, or the Givens rotations.

Firstly, in the Gram-Schmidt process, QRD consists of two steps, namely orthogonalization and normalization steps. In the orthogonalization step, a normal vector of the matrix Q that is already normalized in the normalization step is obtained and the remaining columns of Q are orthogonalized to the obtained column. Note that the matrix Q is initiated to H. Therefore, the corresponding row of the matrix R is obtained from Q.

Secondly, the Householder reflection (or Householder transformation) is a transformation that is used to obtain the upper triangular matrix R from which the matrix Q can be obtained if required. The idea behind this technique is to obtain the matrix R using a reflection matrix. This reflection matrix, also known as Householder matrix, is used to cancel all the elements of a vector except its first element which is assigned the norm of the vector. Therefore, the columns of the matrix H are treated iteratively to obtain the R matrix. Thirdly, QRD can also be computed with a series of so-called Givens rotations. Each rotation zeros an element in the subdiagonal of the matrix H, so that a triangular shape R is obtained. The concatenation of all the Givens rotations forms the orthogonal Q matrix.

Other techniques are also known which do not need further development.

However, in all those prior art methods, the full QRD processing is needed at every detection processing of a transmit vector and lies on a periodical estimation of a channel matrix H. Especially in the case of multi-carrier MIMO systems, the overall computational complexity of QRD is significantly increased since the full QRD for each channel estimation requires much more processing power than the conventional detectors may offer.

It would be desirable to provide an alternative technique which is more suitable for processors used in the mobile equipments, and which processors cannot, generally speaking, support the huge amount of processing resources required by the known prior art techniques.

SUMMARY OF THE INVENTION

It is an object of the present invention to provide a process for performing QRD of a channel matrix in a MIMO wireless communication system which is more adapted to the architecture and performance of the processors located in mobile equipments.

It is a further object of the invention to provide an iterative process which achieves QRD of a channel matrix in a MIMO wireless communication system.

It is another object of the present invention to provide a process for decreasing time complexity required for a QRD of a channel matrix in a MIMO system.

These and other objects are achieved by a process for performing a QRD of a channel matrix of a wireless communication channel system, said process involving the steps of:

performing a full QRD of one channel matrix for the purpose of deriving a first QR representation of the channel;

performing a second iterative QRD of an adjacent channel matrix, said second iterative QRD using the results of said first QR representation as well as the difference of the two adjacent channel matrices ΔH.

More particularly, the process is characterized in that the iterative QRD is performed in response to the detection of a high level of workload of the processor.

In one embodiment, the wireless communication system is a Code Division Multiple Access (CDMA) communication system fitted with MIMO spatial-multiplexing.

Alternatively, the system is an orthogonal frequency-division multiplexing (OFDM) standard supporting MIMO spatial-multiplexing.

In one embodiment, the communication system is a MIMO OFDM communication system comprising a transmitter and a receiver. The channel matrix $H_{i,j}$ corresponds to resource elements $(RE)_{i,j}$ of a signal s, for a given time sampling i and a given sub-carrier j within the considered OFDM, and the signal s is transmitted by the transmitter and is received by said receiver in the form of a received signal $r=H_{i,j}*s+n$, with n representing noise of the system.

The process involves the steps of:

estimating an initial channel matrix $H_{0,0}$ and performing an initial full-QRD of said initial channel matrix $H_{0,0}$ in an initial unitary matrix $Q_{0,0}$ and in an initial upper triangular matrix $R_{0,0}$;

entering into a loop for an index j=1, 2, ..., $n_{OFDM}$−1;

providing the estimate of the channel matrix $H_{i,j}$;

computing the variation ΔH between $H_{i,j-1}$ and $H_{i,j}$;

computing $R_{i,j-1}^{-1}$ by inversing the upper triangular matrix $R_{i,j-1}$;

computing a value $F_1$ by applying the following formula:

$$F_1 = R_{i,j-1}^{-H}((H_{i,j-1})^H \Delta H + (\Delta H)^H H_{i,j-1} + (\Delta H)^H \Delta H) R_{i,j-1}^{-1};$$

computing the square Frobenius norm of $F_1$ given by $(\|F_1\|_F)^2$;

testing if $(\|F_1\|_F)^2 < 1$;

if test is positive computing (190) a value $F_2$ by applying the formula:

$$F_2 = -2U\{(F_1)^H\}U\{F_1\}, \text{ where } U\{.\} \text{ is a matrix operator;}$$

computing the upper triangular matrix $R_{i,j}$ and the unitary matrix $Q_{i,j}$ of the channel matrix $H_{i,j}$ by applying the equations:

$$R_{i,j} = (I + U\{F_1\} + U\{F_2\})R_{i,j-1} \text{ and then } Q_{i,j} = (H_{i,j-1} + \Delta H)R_{i,j-1}^{-1};$$

if the preceding test is negative computing the upper triangular matrix $R_{i,j}$ and the unitary matrix $Q_{i,j}$ by applying the equations $$R_{i,j} = (I + U\{F_1\})R_{i,j-1} \text{ and then } Q_{i,j} = (H_{i,j-1} + \Delta H)R_{i,j}^{-1};$$

providing $Q_{i,j}$ and $R_{i,j}$ as outputs to the detector;

incrementing the index j and for each index j=1, 2, ... $n_{OFDM}$−1 looping back for considering a next RE in the following OFDM symbol.

The invention also achieves a receiver for a wireless communication channel system, which comprises:

means for performing a full QRD of one channel matrix for the purpose of deriving a first QR representation of the channel;

means for performing a second iterative QRD of an adjacent channel matrix, said second iterative QRD using the results of said first QR representation as well as the difference of the two adjacent channel matrices ΔH.

In one embodiment, the iterative QRD is performed in response to the is detection of a high level of workload of the processor.

In one particular embodiment, the receiver is a Code Division Multiple Access (CDMA) standard supporting MIMO spatial-multiplexing. Alternatively, the receiver complies with Orthogonal frequency-division multiplexing (OFDM) standard supporting MIMO spatial-multiplexing.

DESCRIPTION OF THE DRAWINGS

Other features of one or more embodiments of the invention will be best understood by reference to the following detailed description when read in conjunction with the accompanying drawings.

DESCRIPTION OF THE PREFERRED EMBODIMENT

Figure 1:
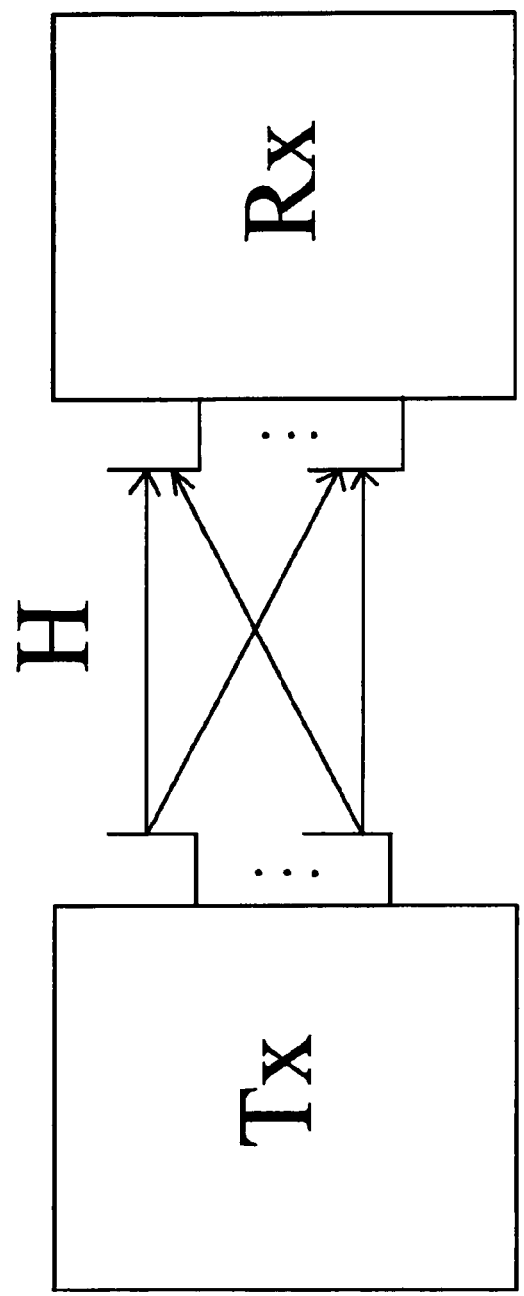
FIG. 1 illustrates the architecture of a MIMO wireless communication system.
Figure 2:
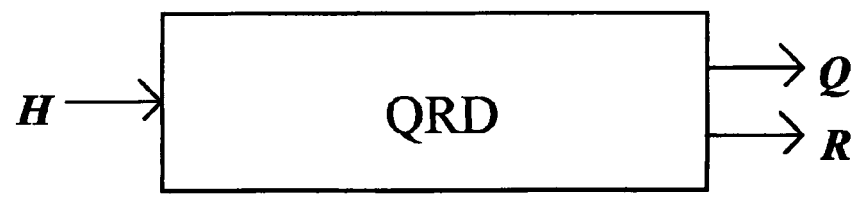
FIG. 2 illustrates a block diagram of a conventional QRD.

There will now be described one embodiment of the invention which achieves a very general process for performing a QRD of a channel matrix which is based on an iterative process and thus only requires one full QRD at the initialization of the process.

Furthermore, the process can be used in any configuration where a signal s needs to be detected from the knowledge of observations r in the formula below:

$$r = Hs + n \quad (1)$$

The generality of the problem to be solved results in the fact that the process of the invention can be executed in any OFDM standard supporting MIMO spatial-multiplexing mode, e.g. IEEE 802.16, IEEE 802.11, 3GPP Long Term Evolution (LTE) and is particularly advantageous in the case of a large number of antennas and consequently in the case of the 3GPP LTE-Advanced (LTE-A) standard. The above mentioned process can also be performed in a Time Division Multiple Access (TDMA), a Frequency Division Multiple Access (FDMA) or a Code Division Multiple Access (CDMA) communication system. The above mentioned process has been is shown to be particularly efficient in the case of normative channel models.

For the sake of clarity, the description which follows hereinafter will be more particularly focused on a MIMO OFDM system, for instance in the perspective of the future LTE(-A) standard. The channel of the system corresponds to a Resource Element (RE) of a signal s being transmitted by the transmitter to the receiver of the same. It is important to note that the general purpose of performing QRD of the above mentioned channel matrix is to facilitate the decoding of the signals that are transmitted to the receiver of the MIMO system. For instance, QRD is generally performed by (QRD)-based quasi-optimal detectors, such as the so-called Successive Interference Cancellers (SIC) or Sphere Decoders (SD).

1. Theorical Considerations

Let us consider the LU Factorization (LUF) of the perturbed identity matrix:

I+E=LU, where E is a perturbation, namely a "small" variation of the identity matrix, and L and U are lower and upper triangular matrices, respectively.

The particular case of the LUF of the identity matrix is the classical intermediate step for the general LUF of any perturbed matrix A'=A+E demonstration.

The LUF and Cholesky Factorization (CHF) of any perturbed matrix A=A+E have been proposed by Dopico and Molera in the reference below:

J. M. Dopico, and F. M. Molera, "*Perturbation theory for factorizations of LU type through series expansions*", SIAM Journal on Matrix Analysis and Applications, 27(2): 561-581, 2006.

Theorem 1: Let F be a k×k Hermitian matrix and let us define recursively the following upper triangular matrices:

$$R_1 = U\{F\},$$

$$R_i = U\{-(R_1)^H R_{i-1} - (R_2)^H R_{i-2} - \ldots - (R_{i-2})^H R_2 - (R_{i-1})^H R_1\}, \text{ for } i \geq 2$$

Let H be a Hermitian positive definite matrix with Cholesky factorization $H = R^H R$. Let us consider the Hermitian matrix H+E, and define $F = R^{-H} E R^{-1}$. Under the condition that the spectral radius of F is ϱ (|F|)<1, we have:

$$R' = (I + \Sigma_{i=1\ldots\infty} R_i) R$$

The spectral radius constraint ϱ (|F|)<1 is the convergence criterion of the series, and U{.} is a matrix operator defined as $$U\{A_{ij}\} = A_{ij} \text{ if } i < j,$$

$$U\{A_{ij}\} = A_{ij}/2 \text{ and}$$

$$U\{A_{ij}\} = 0 \text{ otherwise.}$$

The Cholesky Factorization (CHF) of A' allows introducing a novel $n^{th}$ order formula for the QRD of any perturbed matrix, called Iterative QRD (IQRD).

Theorem 2: Let F be any k×k complex matrix and let us define recursively the following upper triangular matrices:

$$R_1 = U\{F\},$$

$$R_i = U\{-(R_1)^H R_{i-1} - (R_2)^H R_{i-2} - \ldots - (R_{i-2})^H R_2 - (R_{i-1})^H R_1\}, \text{ for } i \geq 2$$

Let H be any Hermitian matrix, consider any other complex matrix H'=H+ΔH, and define $$F = R^{-H}(H^H \Delta H + (\Delta H)^H H + (\Delta H)^H \Delta H) R^{-1}. \text{ If } ϱ(|F|) < 1,$$
then:

$$R' = (I + \Sigma_{i=1\ldots\infty} R_i) R$$

2. Iterative Process

The inventor has discovered that, beyond the LU factorization taught by Dopico and Molera, it is possible to achieve a full QRD based on the series Fi (with i=1 to n) used for the LU factorization.

The inventor more particularly discovered that only the first orders of such LU factorization series $F_1$ and $F_2$ are required for the purpose of achieving a useful QRD of a channel matrix.

Thus achieving limited complexity in the QRD process.

In addition to that first advantage, there is further proposed to use such first and second orders $F_1$ and $F_2$ of the LU factorization series for the purpose of deriving an highly effective iterative process serving, not only for the QRD of one single H matrix but achieving successive QRDs with successive values of the channel matrix H, either in the time domain or the frequency domain or both.

More particularly, the highly efficient iterative process which is allowed can be used for performing successive QRDs of a timely varying channel matrix, or successive QRD of channel matrix of different subcarriers with only the requirement of one full QRD.

With the result of saving a large amount of processing resources.

There is furthermore derived a contextual process which achieves the switching of a QRD in the detector of a wireless receiver between two distinctive modes, a first mode wherein the QRD is achieved by conventional methods and a second mode wherein the QRD is switched to an iterative mode for the purpose of saving processing resources.

A first significant advantage of the process which is described below is the fact that the incremental process for performing the computation of the series $F_i$ converging to the QRD can be used for achieving an iterative process.

Such iterative process can be used for QRD either in the time domain—for the purpose of computing two QRDs of two matrices corresponding to two consecutive sampling periods—in the frequency domain—that is to say for a QRD of the channel matrix corresponding to two sub-carriers—and also in both the time and frequency domains.

Such iterative process can be achieved even when the Digital Signal Processor (DSP) shows limited processing resources. Also, a significant decrease of time complexity of QRD performance is achieved.

Figure 5:
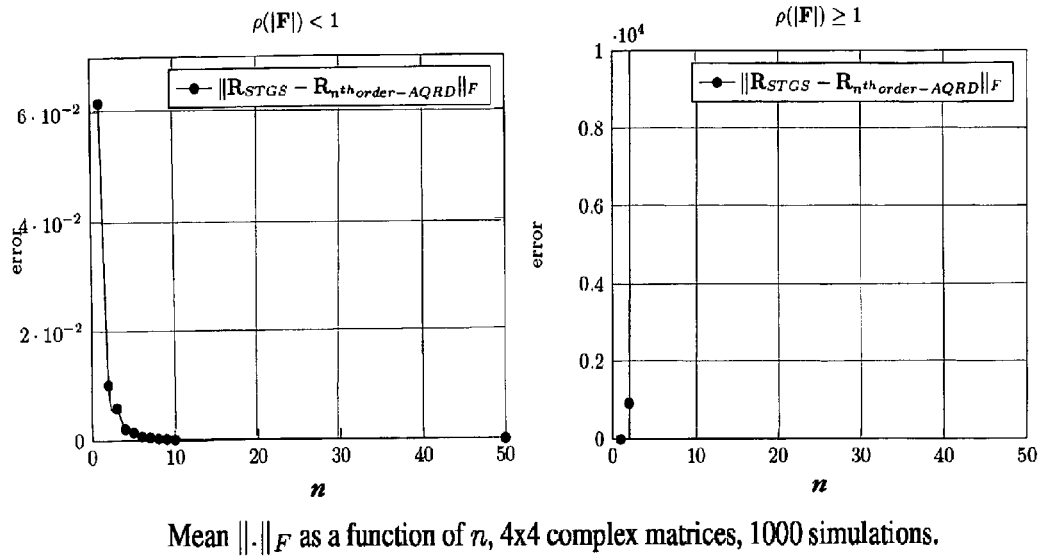
FIG. 5 illustrates the Frobenius norm of the difference between the reference full-QRD outputs and the proposed formula as a function of series order n, in the case of 4×4 complex matrices, and with a number of 1,000 simulations.

It has been discovered that one may obtain the QRD outputs of any given channel by considering the knowledge of the QRD outputs Q and R of a distinct but similar channel and the variation E between both. One may expect a decrease of the time as well as the complexity without significant loss of performance and accuracy, as illustrated in FIG. 5.

Figure 7:
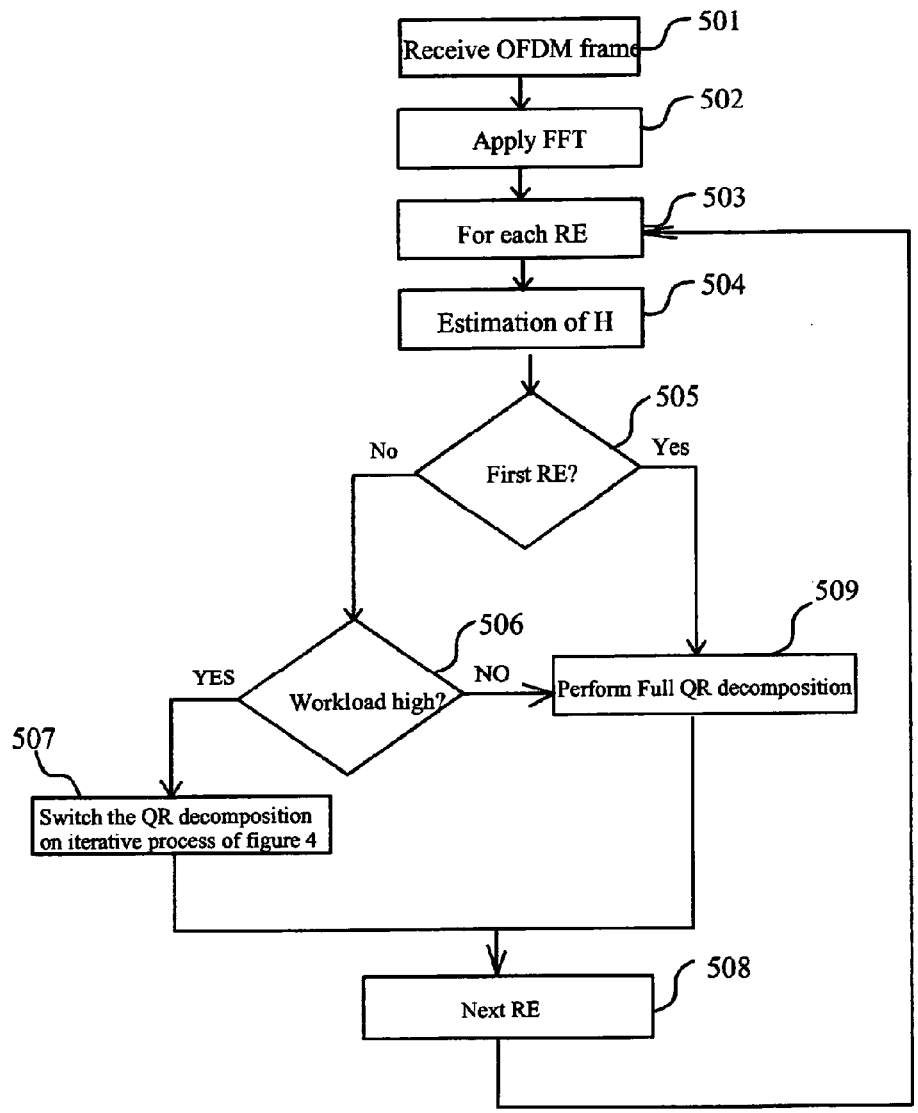
FIG. 7 is a flow chart of one embodiment of the invention using the iterative QRD as a response to the load of the processor.

FIG. 7 depicts the workload balance between a high-computational—although optimal—full QRD block 509 and the proposed IQRD block 507 that is cheaper. As presented otherwise, the IQRD relies on the QRD outputs of a full QRD at the first Resource Element (RE) block 505. This operation is processed over the whole grid of transmit symbols, denoted as the receive OFDM frame block 501.

Figure 3:
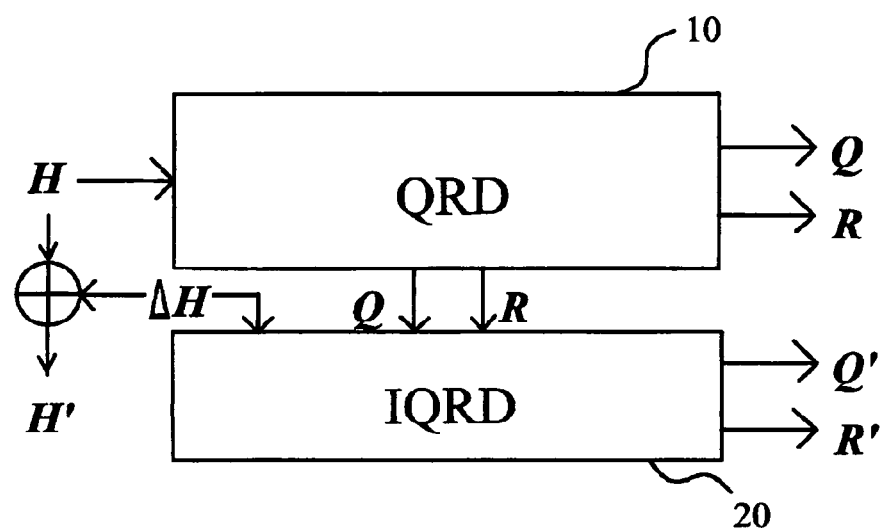
FIG. 3 illustrates a block diagram of one embodiment of an iterative process for performing a QRD of two adjacent H channel matrices.

More practically, by considering the QRD of two channels H and H' corresponding to two adjacent REs of an OFDM system considered as an illustrative example, one may consider the functional block illustrated in FIG. 3.

Indeed FIG. 3 shows two distinctive blocks, a first block 10 which achieves QRD of an estimated initial channel H (corresponding to one particular initial RE) in accordance with any conventional method and a second so-called Iterative QRD IQRD block 20—which uses the result of the QRD performed by first block 10 as well as the value of the difference $E=\Delta H=H_{i',j'}-H_{i,j}$ of two consecutive channels $H_{i,j}$ and $H_{i',j'}$, corresponding to consecutive RE at position (i,j) and (i',j'), respectively.

The convergence criterion respect or not will have a strong impact on performance. In FIG. 3, the series convergence to an optimal full QRD in the sense of the Frobenius norm of the difference of the two results is highlighted when the convergence criterion, namely ϱ (|F|)<1, is respected. In the same way, the divergence and its dramatic impact on the accuracy of the result when the order increases is depicted.

Although this has not been illustrated in FIG. 3 in order to keep that figure simple, one should notice that one may use the same algorithm again for computing the $Q_{i'',j''}$ and $R_{i'',j''}$ outputs of a subsequent channel $H_{i'',j''}$ corresponding to another consecutive RE at position (i'',j'').

The advantage of such an iterative process is that a conventional QRD—that involves high complexity and requires much time—is performed only once for an initial channel matrix $H_{i,j}$ corresponding to one particular RE. The computation of the QRD outputs of any subsequent channel matrix $H_{i',j'}$ is achieved by executing the algorithm of the proposed process. Accordingly, there is no need of performing a full QRD for each channel realization of the system and thus the amount of processing resources needed for performing QRD of any subsequent channel matrix is limited.

In order to provide a more detailed description of the above mentioned to process we consider that the QRD is performed in a channel matrix $H_{i,j}$ corresponding to a resource element RE at position (i,j) of a signal s transmitted to the receiver of a MIMO communication system. In particular, we consider that the signal s is received by the receiver in the form of a signal $r=H_{ij}*s+n$, where n represents an Additive White Gaussian Noise (AWGN).

With respect to FIG. 4, there will now be described one particular embodiment of a process adapted to a MIMO OFDM wireless communication system.

In a first step 110, the process estimates an initial channel matrix $H_{0,0}$ and performs an initial QRD of said matrix $H_{0,0}$ in an initial unitary matrix $Q_{0,0}$ and in an initial upper triangular matrix $R_{0,0}$. The initial QRD may be performed by using conventional methods such as those mentioned in the background art and in which a full QRD is necessary. In one embodiment the Gram-Schmidt method is considered for such initial QRD.

In a further step 120, the process proceeds with entering into a loop for j=1, 2, . . . , $n_{OFDM}-1$.

In a step 130, the process proceeds with estimating the channel matrix $H_{i,j}$ corresponding to a resource element RE at position (i,j) of the transmitted signal s. The channel estimation associated to each RE position is performed by means known to the skilled man, and particularly based on the use of so-called pilot or reference signals.

In a next step 140 the process proceeds with computing the variation $\Delta H$ between two consecutive values $H_{i,j-1}$ and $H_{i,j}$. In particular, $H_{i,j-1}$ is a channel corresponding to a RE at position (i,j-1) preceding the RE at position (i,j). Clearly, for (i,j)=(0,1), the channel $H_{i,j-1}$ corresponds to the initial channel $H_{0,0}$.

In a further step 150, the process proceeds with computing $R_{i,j-1}^{-1}$ by inverting the upper triangular matrix $R_{i,j-1}$. It should be noticed that, although the general inversion of a full rank matrix requires a significant amount of time and computing resources, the inversion of matrix $R_{i,j-1}$ is greatly facilitated thanks to its triangular nature. Particularly, when the matrix $R_{i,j-1}$ has real entries on diagonal and complex entries elsewhere, the computational complexity of its inversion can be shown to be $O(2/3n^3)$. Since the inversion algorithm does not offer potential parallelism, the time complexity remains the same. However, as shown below, the interesting point is that the rest of the algorithm applied in the proposed process is fully parallel since it is only constituted of matrix multiplications and additions. Thus, the time complexity of the full process of FIG. 4 remains close to $O(2/3n^3)$.

In a next step 160 the process proceeds with computing a first value $F_1$ in accordance with the following formula:

$$F_1=R_{i,j-1}^{-H}(H_{i,j-1}^H\Delta H+(\Delta H)^H H_{i,j-1}+(\Delta H)^H\Delta H)R_{i,j-1}^{-1}$$

Where $H_{i,j-1}^H$ is the result of the hermitian operator applied to the matrix $H_{i,j-1}$ It should be noticed that such operations take reduced time since we have already computed $R_{i,j-1}^{-1}$ in the step 150 and the rest computations to be done are fully parallel additions and multiplications.

Alternatively, in one particular embodiment, one may consider only the first part of the formulation above by neglecting the residual term $(\Delta H)^H\Delta H$, i.e. a value $F_1$ computed as follows:

$$F_1=R_{i,j-1}^{-H}((H_{i,j-1})^H\Delta H+(\Delta H)^H H_{i,j-1})R_{i,j-1}^{-1}$$

In a next step 170 the process computes the square Frobenius norm of $F_1$ given by the formula below:

$$(\|F_1\|_F)^2=Tr\{F^H F\}.$$

The computation of the Frobenius norm is known to the person skilled in the art.

In a next step 180, the process proceeds with testing if $(\|F_1\|_F)^2<1$. Such test is used to determine whether the series may converge or not.

As shown below, in the case where the series convergence is respected, a second value is computed which is based on the second order of LU factorization series. In the case it is not, a 1st order of that LU factorization series is processed in order to avoid a significant inaccuracy in the output of the upper triangular matrix $R_{i,j}$.

If the test result is positive, and thus the series convergence is respected, the process proceeds to a step 190 and computes a second value $F_2$ by applying the formula:

$$F_2=-2U\{(F_1)^H\}U\{F_1\},$$

where $U\{.\}$ is a matrix operator, defined as follows:

$U\{A_{ij}\}=A_{ij}$ if $i<j$, $U\{A_{ij}\}=A_{ij}/2$ if $i=j$ and $U\{A_{ij}\}=0$ otherwise.

In a next step 200, the process proceeds with computing the upper triangular matrix $R_{i,j}$ and the unitary matrix $Q_{i,j}$ of the channel matrix $H_{i,j}$ by performing a 2nd order IQRD and particularly applying the equations $R_{i,j}=(I+U\{F_1\}+U\{F_2\})R_{i,j-1}$ and $Q_{i,j}=(H_{i,j-1}+\Delta H)R_{i,j}^{-1}$.

If the test result of step 180 is negative, and thus the series convergence is not respected, the process proceeds to a step 205 computing the upper triangular matrix $R_{i,j}$ and the unitary matrix $Q_{i,j}$ by performing a so-called 1st order IQRD by applying the equations $R_{i,j}=(I+U\{F_1\})R_{i,j-1}$ and $Q_{i,j}(H_{i,j-1}+\Delta H)R_{i,j}^{-1}$.

In a next step 210 the result of the computation of $Q_{i,j}$ and $R_{i,j}$ are outputted to serve in the detection process of the MIMO receiver for eventually decoding the received signal s.

In a step 220 the process increments the index i=0, 2, ..., $n_s-1$ and j for j=1, 2, ..., $n_{OFDM}-1$—where $n_s$ and $n_{OFDM}$ denote the number of OFDM symbols and the number of sub-carriers respectively—and loops back to step 120 for the purpose of processing a next RE.

The above mentioned iterative process for performing QRD is highly advantageous since there is no need to perform a full-QRD for each channel matrix $H_{i,j}$ in order to compute its $Q_{i,j}$ and $R_{i,j}$ outputs.

Only one initial QRD of an initial channel matrix $H_{0,0}$ suffices for computing and $R_{i,j}$ outputs corresponding to subsequent channel matrices $H_{i,j}$.

Thus, the proposed process significantly reduces the latency of the QRD computation. In particular, as mentioned above, the time complexity of the process is $O(2/3n^3)$ and is actually the same with the time complexity of the algorithm used to invert the upper triangular matrix described in the step 150.

Furthermore, the complexity of performing QRD is reduced by the proposed process since the channel matrix $H_{i,j'}$ corresponding to adjacent RE at position (i,j')—and consequently adjacent RE in frequency—do not have to be additionally stored and thus do not require additional memory.

Finally, a very important advantage resulting from the reduced time complexity of the proposed process is that limited processing resources suffice for performing the same.

Figure 4:
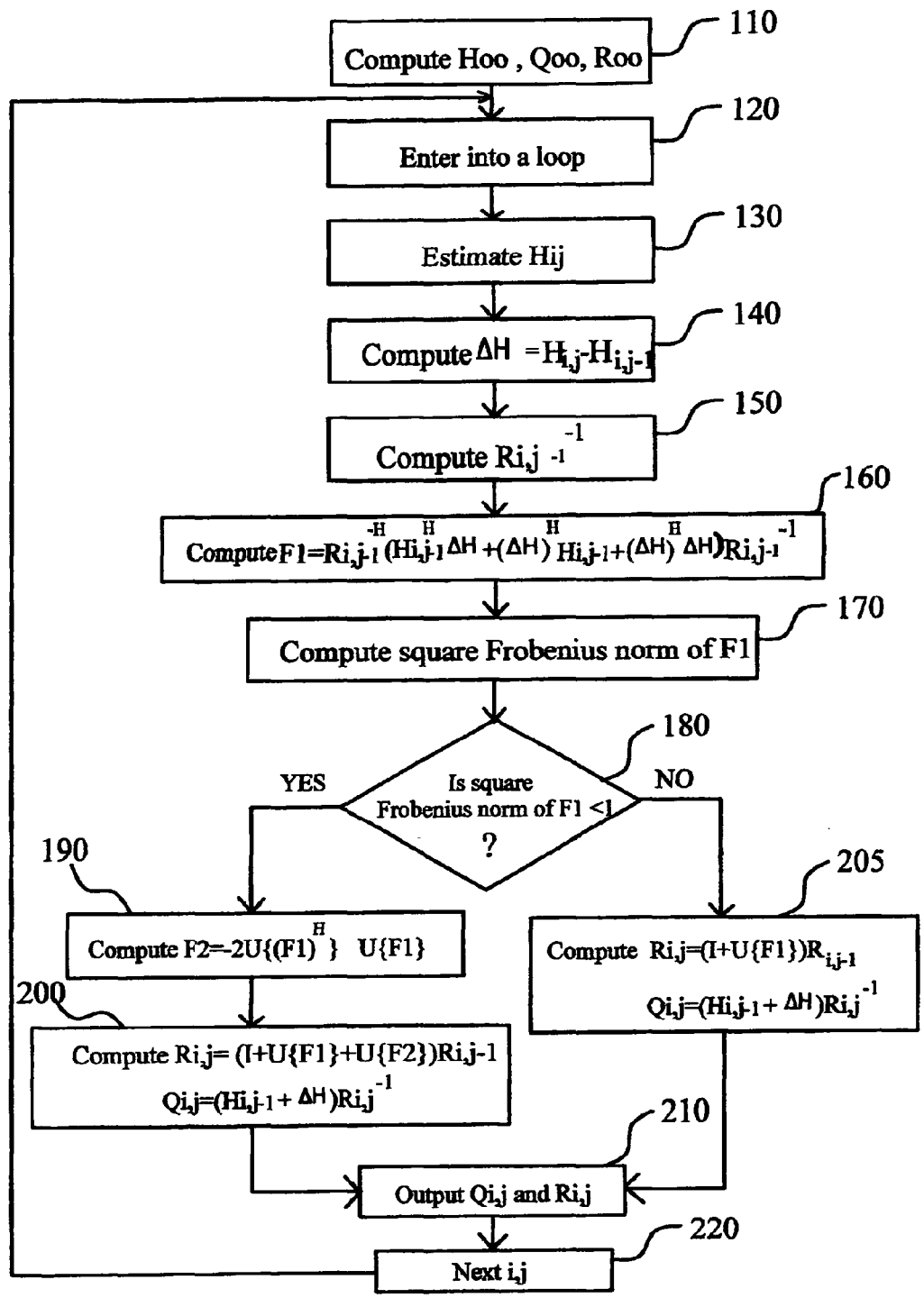
FIG. 4 illustrates one more detailed embodiment of a process for performing a QRD.
Figure 6:
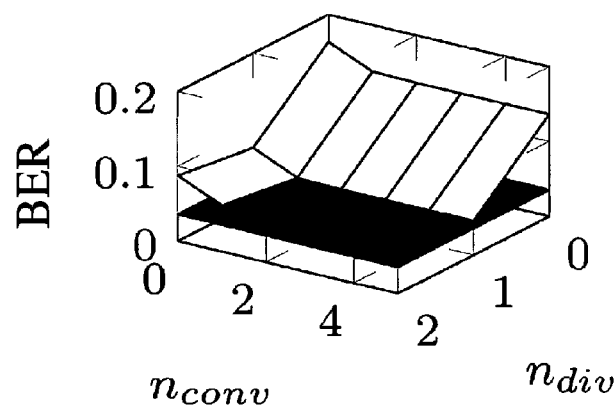
FIG. 6 illustrates the Block Error Rate (BER) for a given SNR=20 dB for multiple Extended Vehicular A (EVA), Extended Typical Urban (ETU) multipath filters models and 512 and 1024 (Fast Fourier Transform) FFT sizes, and approximately 400,000 simulations.

By denoting $n_{div}$ and $n_{conv}$ as the used series orders when the series diverges and converges, respectively, FIG. 4 highlights appropriates pairs ($n_{div}$, $n_{conv}$) by depicting the BER values for a given SNR of 20 dB. These values are compared to the reference Full-QRD SIC in the case of EVA, ETU models with 512 and 1024 FFT sizes. The optimal $n^{th}$ order of the IQRD is infinity when the convergence criterion is respected. However, as depicted in FIG. 6, it can be noticed that the $2^{nd}$ order already offers sufficient results. FIG. 6 also shows one case of divergence.

In the case of a realistic channel, the variation E between H and H' can be very large due to the channel parameters, namely size of the FFT and multipath characteristics and Doppler speed, which have an impact on the band and time coherences, respectively. In such a case, the small performance gain offered by large $n^{th}$ order-IQRD when the series convergence will be wasted by a huge performance degradation when the series diverges. Thus, the motivation of computing the convergence criterion in the algorithm is that it is absolutely necessary in a realistic case. The convergence criterion can be computed through the F matrix, which is already available, in order to use the most accurate IQRD in both cases.

Figures 8A, 8B:
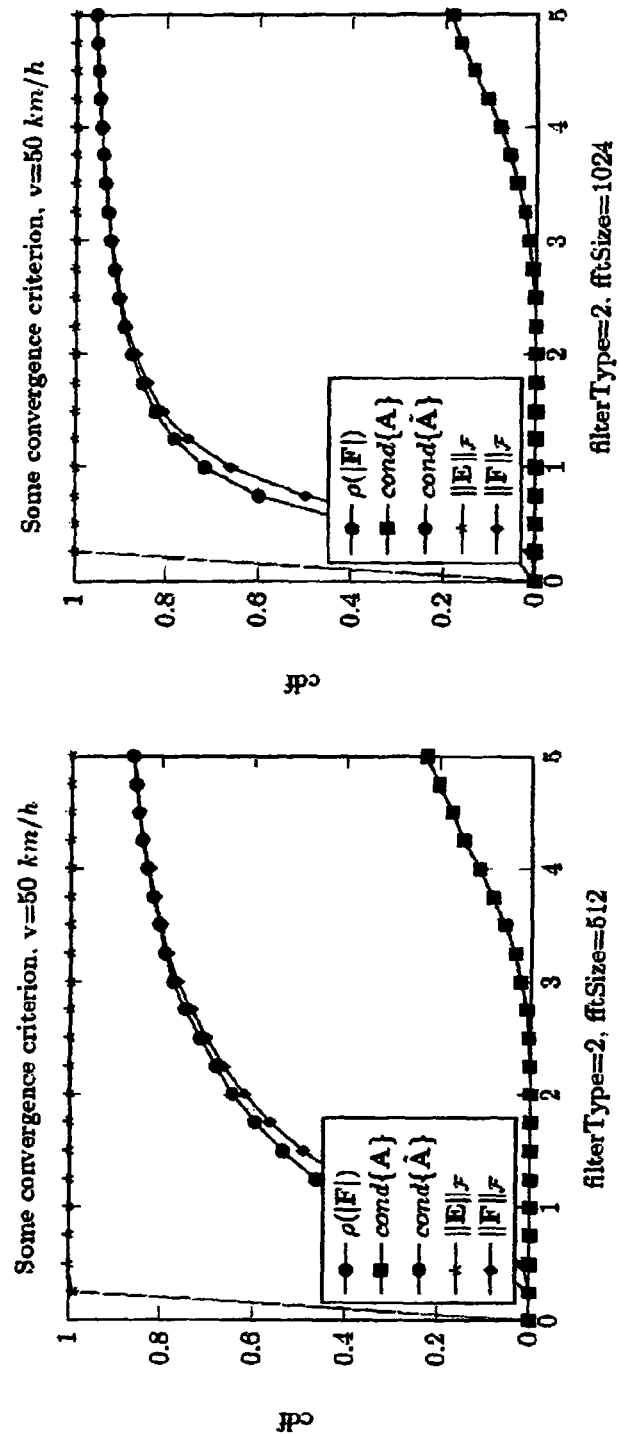
FIGS. 8*a* and 8*b* depict both the spectral radius and Frobenius norm criterions—among other—in the case of an ETU filter, FFT sizes of 512 and 1024 and a Doppler speed of 50 km/h.

The convergence criterion consists in ensuring that the spectral radius is strictly above 1. However, the spectral radius expression relies on the eigenvalues computation which is an expensive step in the sense of the computational complexity. In this invention, we propose to replace it by the Frobenius norm of F, namely $Tr\{F^H F\}$. The measurement tool is shown by simulations to be very close to the theoretical convergence criterion for a very small time complexity, as depicted in FIGS. 8a and 8b depict both the spectral radius and Frobenius norm criterions among other—in the case of an ETU filter, FFT sizes of 512 and 1024 and a Doppler speed of 50 km/h.

With respect to FIG. 7 there is now described one embodiment of the invention which takes advantage of the high efficiency of the iterative QRD described above.

As mentioned above, the iterative process requires a full QRD of at least a first is channel matrix $H_{0,0}$, which full QRD can be then followed by iterative computations of the QRDs.

Since the complexity of the iterative QRD is significantly lower than the one of a full QRD, there is thus proposed to achieve an adaptive QRD process which takes into account the contextual workload of the processor.

If the processor has significant resources which are available, then the QRD is based on either the iterative or a full rank QRD in accordance with a channel variation criterium.

On the contrary, should the processor becomes overloaded with other tasks, such as video performance, mp3 reading, etc. ..., then the QRD is switched to the above described iterative process for the purpose of reducing the amount of digital processing resources required for performing the QRD.

FIG. 7 illustrates such a process.

In a step 501, the process proceeds with the receiving of an OFDM frame in accordance with any conventional technique.

Then, in a step 502 a FFT is applied for the purpose of determining the different constituent of the OFDM frame, that is to say the RE.

The process then enters a loop, in a step 503.

In a step 504, the process exploits the reference signals and performs an estimation of the channel corresponding to some RE positions. The channel estimation at each position is then obtained by interpolation.

Step 505 is a test for determining whether the RE is the first RE, in which case the process proceeds with a step 509 which results in a full QRD in accordance with any conventional method. The process then proceeds to a step 508 which considers the next RE and then loops back to step 503 for the purpose of processing such next is RE.

If the test of 505 lead to an answer NO, then the process proceeds to a further test, in a step 506, which is the determination whether the workload of the DSP within the mobile equipment is superior to one predetermined level, in which case, the process proceeds to a step 507 wherein the QRD is switched on a iterative mode so as to take advantage of the lower complexity of the iterative process and thus release the processor. The process then proceeds to step 508 for the consideration of the next RE.

If the test of step 506 has revealed that the workload of the processor is not significantly high, then the process proceeds to step 509 where the next QRD may be, again, based on a full QRD, before proceeding again to steps 508 and 503 for the purpose of exploiting the next RE.

A very flexible process is achieved which adapts the QRD complexity in accordance to the load of the processor within the mobile.

The invention claimed is:

1. A process implemented in a wireless receiver for performing a QR Decomposition, QRD, of a channel matrix obtained by the wireless receiver in a wireless communication channel system, said process comprising:
   performing a full first QR Decomposition, QRD, of one channel matrix for deriving a first QR representation of the channel; and
   performing, by the wireless receiver, a second iterative QR Decomposition, QRD, of an adjacent channel matrix in a domain selected from the group consisting of the time domain and the frequency domain, said second iterative QR Decomposition, QRD, is obtained, using the results of said first QR representation as well as the difference between the two adjacent channel matrices $\Delta H = H_{i',j'} - H_{i,j}$ of two consecutive channels $H_{i,j}$ and $H_{i',j'}$, corresponding to consecutive Resource Elements (REs) at position (i,j) and (i',j') respectively.

2. The process according to claim 1, wherein said iterative QR Decomposition, QRD, is performed in response to the detection of a high level of workload of the processor.

3. The process according to claim 1, wherein said process is executable in any Code Division Multiple Access (CDMA) standard supporting Multiple-Input Multiple-Output (MIMO) spatial-multiplexing.

4. The process according to claim 1, wherein said process is executable in any Orthogonal Frequency-Division Multiplexing (OFDM) standard supporting Multiple-Input Multiple-Output (MIMO) spatial-multiplexing.

5. The process according to claim 1, wherein said wireless communication system is a Multiple-Input Multiple-Output (MIMO) Orthogonal Frequency-Division Multiplexing (OFDM) communication system comprising a transmitter and the receiver, said channel matrix $H_{i,j}$ corresponding to a Resource Element, RE, at position (i,j) of a transmitted signal s where i=0, 2, ..., $n_s$−1 and j=1, 2, ..., $n_{OFDM}$−1, with $n_s$ being denoted as the number of OFDM symbols and $n_{OFDM}$ the number of sub-carriers, said signal s being transmitted by said transmitter and being received by said receiver in the form of a received signal r=$H_{i,j}$*s+n, with n representing an Additive White Gaussian Noise (AWGN), said process comprising:
- estimating an initial channel matrix $H_{0,0}$ and performing an initial QR Decomposition, QRD, of said initial channel matrix $H_{0,0}$ in an initial unitary matrix Q0,0 and in an initial upper triangular matrix $R_{0,0}$;
- entering into a loop for an index i=0, 2, ..., $n_s$−1 and j=1, 2, ... $n_{OFDM}$−1, where $n_s$ and $n_{OFDM}$ denote the number of OFDM symbols and the number of sub-carriers respectively;
- estimating the channel matrix $H_{i,j}$;
- computing the variation ΔH between $H_{i,j}$ and $H_{i,i-1}$;
- computing $(R_{i,j-1})^{-1}$ by inversing the upper triangular matrix $R_{i,j-1}$;
- computing a value $F_1$ by applying the following formula:

$F_1 = R_{i,j-1}^{-H}(H_{i,j-1}^H \Delta H + (\Delta H)^H H_{i,j} + (\Delta H)^H \Delta H)R_{i,j-1}^{-1}$,
  where $H_{i,j-1}^H$ is the result of the hermitian operator applied to the matrix $H_{i,j-1}$;

- computing the square of the Frobenius norm of $F_1$ given by $(\|F_1\|_F)^2$;
- testing if $(\|F_1\|_F)^2 < 1$;
- if a result of the testing is positive computing a value $F_2$ by applying the formula:

$F_2 = -2U\{(F_1)^H\}U\{F_1\}$, where $U\{.\}$ is a matrix operator;

- computing the upper triangular matrix $R_{i,j}$ and the unitary matrix $Q_{i,j}$ of the channel matrix $H_{i,j}$ by applying the equations:

$R_{i,j} = (I + U\{F_1\} + U\{F_2\})R_{i,j-1}$ and $Q_{i,j} = (H_{i,j-1} + \Delta H)R_{i,j}^{-1}$;

- if the result of the testing is negative computing (205) the upper triangular matrix $R_{i,j}$ and the unitary matrix $Q_{i,j}$ by applying the equations $R_{i,j} = (I + U\{F_1\})R_{i,j-1}$, and $Q_{i,j} = (H_{i,j-1} + \Delta H)R_{i,j}^{-1}$;

- providing $Q_{i,j}$ and $R_{i,j}$ as outputs; and
- incrementing the index i and the index j and for each index i=0, 2, ... $n_s$−1 and j=1, 2, ..., $n_{OFDM}$−1 looping back to step.

6. A receiver for a wireless communication channel system, said receiver comprising:
- a first processing circuit for performing a first full QR Decomposition, QRD, of any channel matrix for deriving a first QR representation of the channel;
- a second processing circuit for performing a second iterative QR Decomposition, QRD, of an adjacent channel matrix either in the time domain or the frequency domain or both, said second iterative QR Decomposition, QRD, is obtained using the results of said first QR representation as well as the difference between the adjacent channel matrices $\Delta H = H_{i',j'} - H_{i,j}$ of two consecutive channels $H_{i,j}$ and $H_{i',j'}$ corresponding to consecutive Resource Elements (REs) at position (i,j) and (i',j'), respectively.

7. The receiver according to claim 6 wherein said iterative QR Decomposition, QRD, is performed in response to the detection of a high level of workload of the processor.

8. The receiver according to claim 6 complying with the Code Division Multiple Access (CDMA) standard supporting Multiple-Input Multiple-Output (MIMO) spatial-multiplexing.

9. The receiver according to claim 6 further complying with Orthogonal Frequency-Division Multiplexing (OFDM) standard supporting Multiple-Input Multiple-Output (MIMO) spatial-multiplexing.

10. The receiver according to claim 9, said receiver comprising processing circuits for performing a QR Decomposition, QRD, of a channel matrix $H_{i,j}$ of a MIMO communication system, said channel matrix $H_{i,j}$ corresponding to a Resource Element, RE, at position (i,j) of a signal s where i=0, 2, ..., $n_s$−1 and j=1, 2, $n_{OFDM}$−1, with $n_s$ and $n_{OFDM}$ being denoted as the number of symbols and the number of sub-carriers respectively, said signal s being transmitted by a transmitter of the MIMO system and being received by the receiver of such system in the form of a received signal r=$H_{i,j}$*s+n, with n representing an Additive White Gaussian Noise (AWGN), said processing circuits comprising:
- an initial channel estimation unit for estimating an initial channel matrix $H_{0,0}$ and performing an initial QR Decomposition, QRD, of said initial channel matrix $H_{0,0}$ in an initial unitary matrix $Q_{0,0}$ and in an initial upper triangular matrix $R_{0,0}$;
- a looping unit for entering into a loop for i=0, 2, ..., $n_s$−1 and j=1, 2, ..., $n_{OFDM}$−1 wherein while inside the loop, said processing circuits are configured to;
- estimate the channel matrix $H_{i,j}$
- compute the variation ΔH between $H_{i,j}$ and $H_{i,j-1}$;
- compute $R_{i,j-1}^{-1}$ by inversing the upper triangular matrix $R_{i,j-1}$;
- compute a value $F_1$ by applying the following formula:

$F_1 = R_{i,j-1}^{-H}(H_{i,j-1}^H \Delta H + (\Delta H)^H H_{i,j} + (\Delta H)^H \Delta H)R_{i,j-1}^{-1}$;

- compute the square Frobenius norm of F1 given by $(\|F_1\|_F)^2$;
- test if $(\|F_1\|_F)^2 < 1$;
- compute a value $F_2$ by applying the formula:

$F_2 = -2U\{(F_1)^H\}U\{F_1\}$, where $U\{.\}$ is a matrix operator, if a result of the testing is positive;

- compute the upper triangular matrix $R_j$ and the orthogonal matrix $Q_j$ of the channel matrix $H_j$ by applying the equations:

$R_{i,j} = (I + U\{F_1\} + U\{F_2\})R_{i,j-1}$ and $Q_{i,j} = (H_{i,j-1} + \Delta H)R_{i,j}^{-1}$;

- compute the upper triangular matrix $R_{i,j}$ and the unitary matrix $Q_{i,j}$;
- by applying the equations:

$R_{i,j} = (I + U\{F_1\})R_{i,j-1}$ and $Q_{i,j} = +\Delta H)R_{i,j}^{-1}$, if the result of the testing is negative;

- obtain $Q_{i,j}$ and $R_{i,j}$ as outputs; and
- increment the indexes (i,j) and executing the loop for each index i=0, 2, ... $n_s$−1 and j=1, 2, ..., $n_{OFDM}$−1.

* * * * *